US007645079B2

(12) United States Patent
Inukai et al.

(10) Patent No.: US 7,645,079 B2
(45) Date of Patent: Jan. 12, 2010

(54) IMAGE PICKUP APPARATUS HAVING DEVICE FOR REMOVING FOREIGN SUBSTANCE DEPOSITED ON SURFACE OF OPTICAL MEMBER

(75) Inventors: Hiroaki Inukai, Kawasaki (JP); Eiri Tsukatani, Tokyo (JP); Kiyokazu Churei, Yokohama (JP); Taro Fuchigami, Yokohama (JP); Takashi Sugie, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 226 days.

(21) Appl. No.: 11/779,209

(22) Filed: Jul. 17, 2007

(65) Prior Publication Data
US 2008/0019686 A1 Jan. 24, 2008

(30) Foreign Application Priority Data
Jul. 20, 2006 (JP) ............................. 2006-198554

(51) Int. Cl.
G03B 17/00 (2006.01)
B60R 1/06 (2006.01)
(52) U.S. Cl. ...................... 396/529; 359/507
(58) Field of Classification Search ............... 396/529; 359/507
See application file for complete search history.

(56) References Cited

U.S. PATENT DOCUMENTS

| 2003/0202114 | A1* | 10/2003 | Takizawa et al. | 348/335 |
| 2004/0041937 | A1* | 3/2004 | Oshima | 348/335 |
| 2005/0025475 | A1* | 2/2005 | Kurosawa | 396/358 |
| 2006/0279638 | A1* | 12/2006 | Matsuda et al. | 348/208.7 |

FOREIGN PATENT DOCUMENTS

JP 2003-319222 11/2003

* cited by examiner

Primary Examiner—W. B. Perkey
Assistant Examiner—Noam Reisner
(74) Attorney, Agent, or Firm—Canon USA Inc IP Div

(57) ABSTRACT

An image pickup apparatus includes an eyepiece unit configured to facilitate viewing an optical image of an object, an image pickup element configured to convert the optical image of an object into an electrical signal, an optical member disposed in front of the image pickup element and in an imaging light axis, an piezoelectric element disposed on the side of the optical member close to the eyepiece unit, where the piezoelectric element vibrates the optical member, a biasing member disposed on the side of the optical member opposite the piezoelectric element, a lowpass filter holding member configured to hold the optical member, the piezoelectric element, and the biasing member, and an image-pickup-apparatus body chassis having a flat surface portion perpendicular to the imaging light axis, where the flat surface portion has an opening therein. The lowpass filter holding member is disposed in the opening of the body chassis.

4 Claims, 12 Drawing Sheets

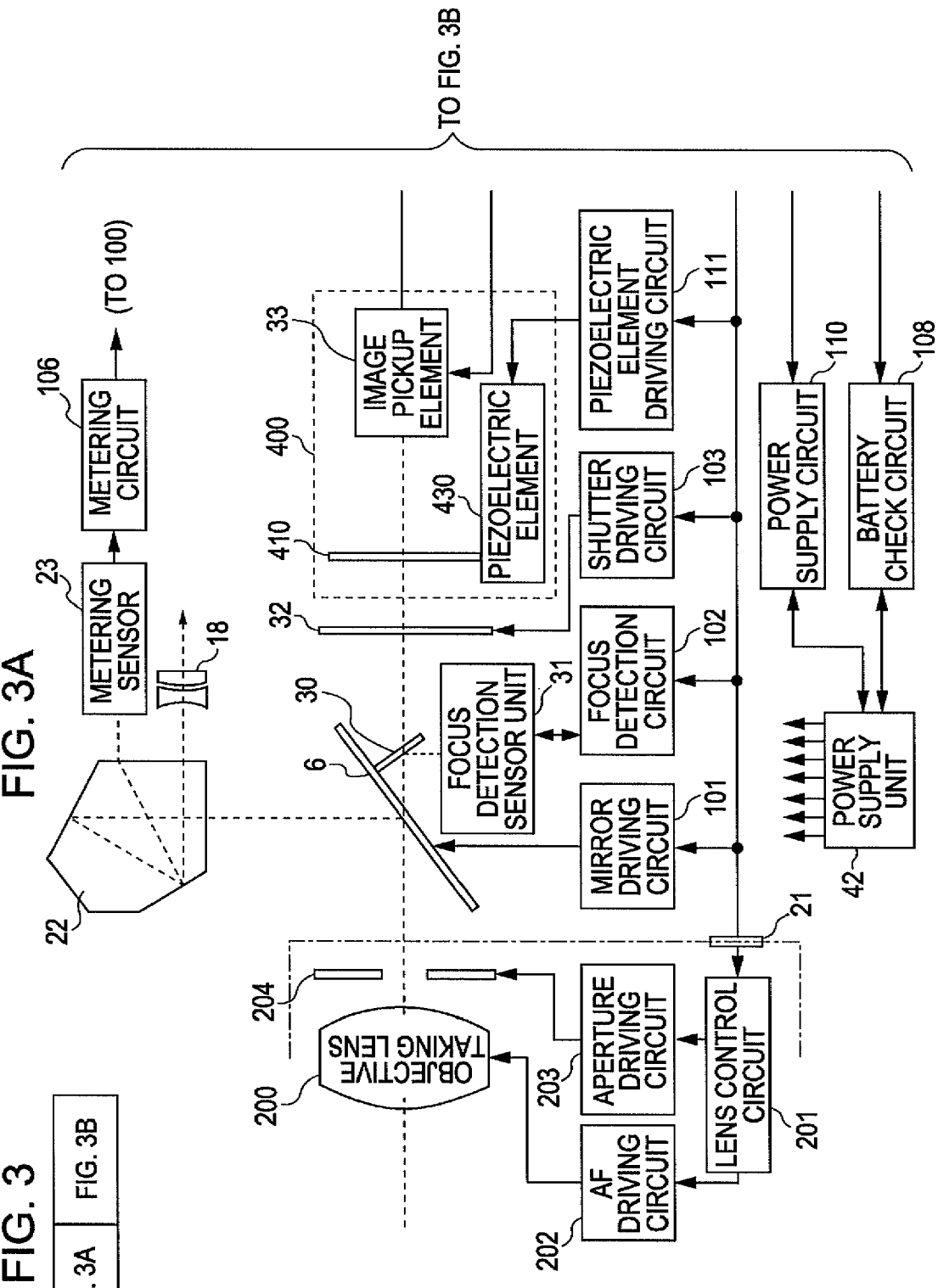

FIG. 3B

FIG. 12A
FIG. 12B
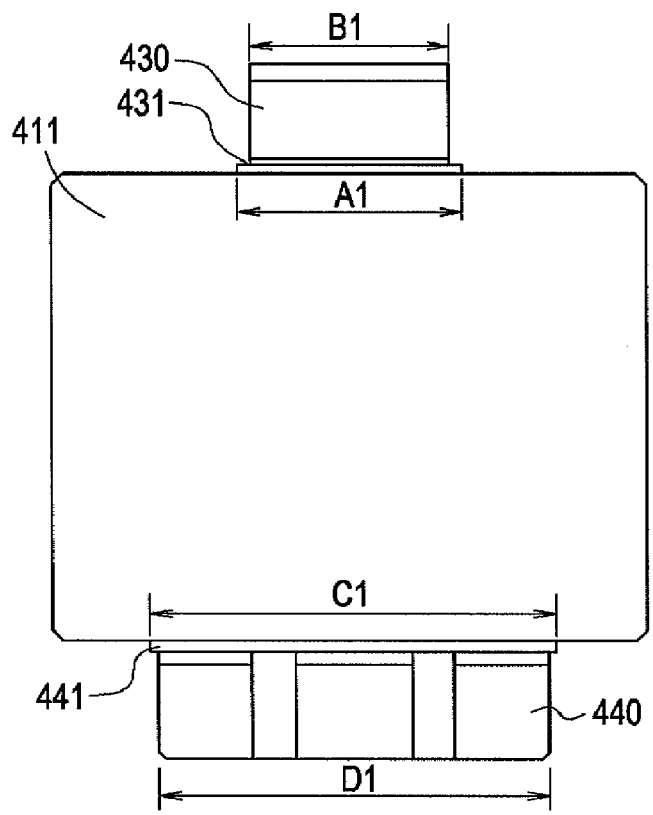
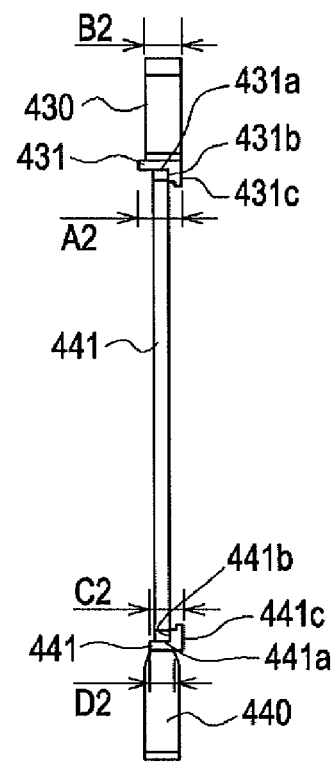
FIG. 13
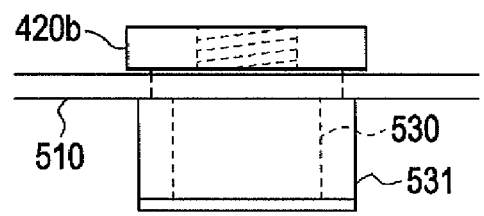

IMAGE PICKUP APPARATUS HAVING DEVICE FOR REMOVING FOREIGN SUBSTANCE DEPOSITED ON SURFACE OF OPTICAL MEMBER

BACKGROUND OF THE INVENTION

1. Field of the Invention

The present invention generally relates to an image pickup apparatus and, in particular, to technology for removing a foreign substance deposited on a surface of an optical member disposed along an imaging light axis.

2. Description of the Related Art

Image pickup apparatuses, such as digital cameras, that capture an image by converting an image signal into an electrical signal receive light using an image pickup element, such as a charged coupled device (CCD) or a complementary metal oxide semiconductor (CMOS) sensor. The image pickup apparatuses convert a photoelectrically converted signal output from the image pickup element to image data. Thereafter, the image pickup apparatuses store the image data on a recording medium, such as a memory card. In such image pickup apparatuses, an optical lowpass filter and an infrared cut filter are disposed on the front side (an object side) of the image pickup element.

If a foreign substance, such as dust or dirt, is deposited on surfaces of the cover glass of the image pickup element or these filters, the foreign substance generates a black spot in a captured image, and therefore, the quality of the image deteriorates.

In particular, since digital single-lens reflex cameras with interchangeable lenses include a mechanical operating unit, such as a shutter and a quick-return mirror, disposed in the vicinity of an image pickup element, a foreign substance, such as dust or dirt, is possibly generated by the operating unit and is deposited on the surfaces of the cover glass of the image pickup element and the filters. In addition, when the lens is changed, a foreign substance may enter inside the camera body from the opening of a lens mount and may be deposited on the surfaces of the cover glass of the image pickup element and the filters.

Japanese Patent Laid-Open No. 2003-319222 (corresponding to U.S. Pat. 2003202114 A1) describes technology in which a dust-proof member that allows an imaging light beam to pass therethrough is disposed on the object side of an image pickup element and is vibrated by means of a piezoelectric element, and therefore, a foreign substance deposited on the surface of the dust-proof member is removed.

In such a structure in which a foreign substance deposited on the surface of an optical member can be removed by vibrating the optical member, a biasing force may be applied to the optical member by means of a biasing member in addition to vibrating the optical member by means of the piezoelectric element.

However, Japanese Patent Laid-Open No. 2003-319222 and other documents have not provided specific proposals in terms of the layout of the vibrating unit, such as that concerning a piezoelectric element, and a biasing member. In particular, a structural member of the body of the image pickup apparatus should maintain rigidity to support the entire body. In addition, the layout of the vibrating unit and the biasing member should be designed so as to maintain rigidity of an eyepiece unit to which an external force tends to be applied.

SUMMARY OF THE INVENTION

The present invention is directed to an image pickup apparatus including a vibrating unit and a biasing member, for removing a foreign substance deposited on an optical member by vibrating the optical member. The image pickup apparatus provides the optimum layout of the vibrating unit and the biasing member so as to maintain the rigidity and compactness of the image pickup apparatus.

According to an aspect of the present invention, an image pickup apparatus includes an eyepiece unit configured to facilitate viewing an optical image of an object, an image pickup element configured to convert the optical image of an object into an electrical signal, an optical member disposed in front of the image pickup element and in an imaging light axis, a vibrating unit disposed on the side of the optical member close to the eyepiece unit, where the vibrating unit vibrates the optical member, a biasing member disposed on the side of the optical member opposite the vibrating unit, where the biasing member urges the optical member towards the vibrating unit, a holding member configured to hold the optical member, the vibrating unit, and the biasing member, and an image-pickup-apparatus body structural member having a flat surface portion perpendicular to the imaging light axis, where the flat surface portion has an opening therein. The holding member is disposed in the opening without being in contact with the flat surface portion.

Further features of the present invention will become apparent from the following description of exemplary embodiments with reference to the attached drawings.

BRIEF DESCRIPTION OF THE DRAWINGS

FIGS. 3A and 3B are block diagrams illustrating an exemplary electrical configuration of the digital single-lens reflex camera according to the embodiment of the present invention.

FIG. 12A is a front view illustrating a vibration transfer member and a biasing force transfer member.

FIG. 12B is a side view illustrating the vibration transfer member and the biasing force transfer member.

FIG. 13 is a diagram illustrating a floating structure of an image pickup element holding member and a lowpass filter holding member.

DESCRIPTION OF THE EMBODIMENTS

Embodiments of the present invention will be described in detail with reference to the accompanying drawings.

Figure 1:
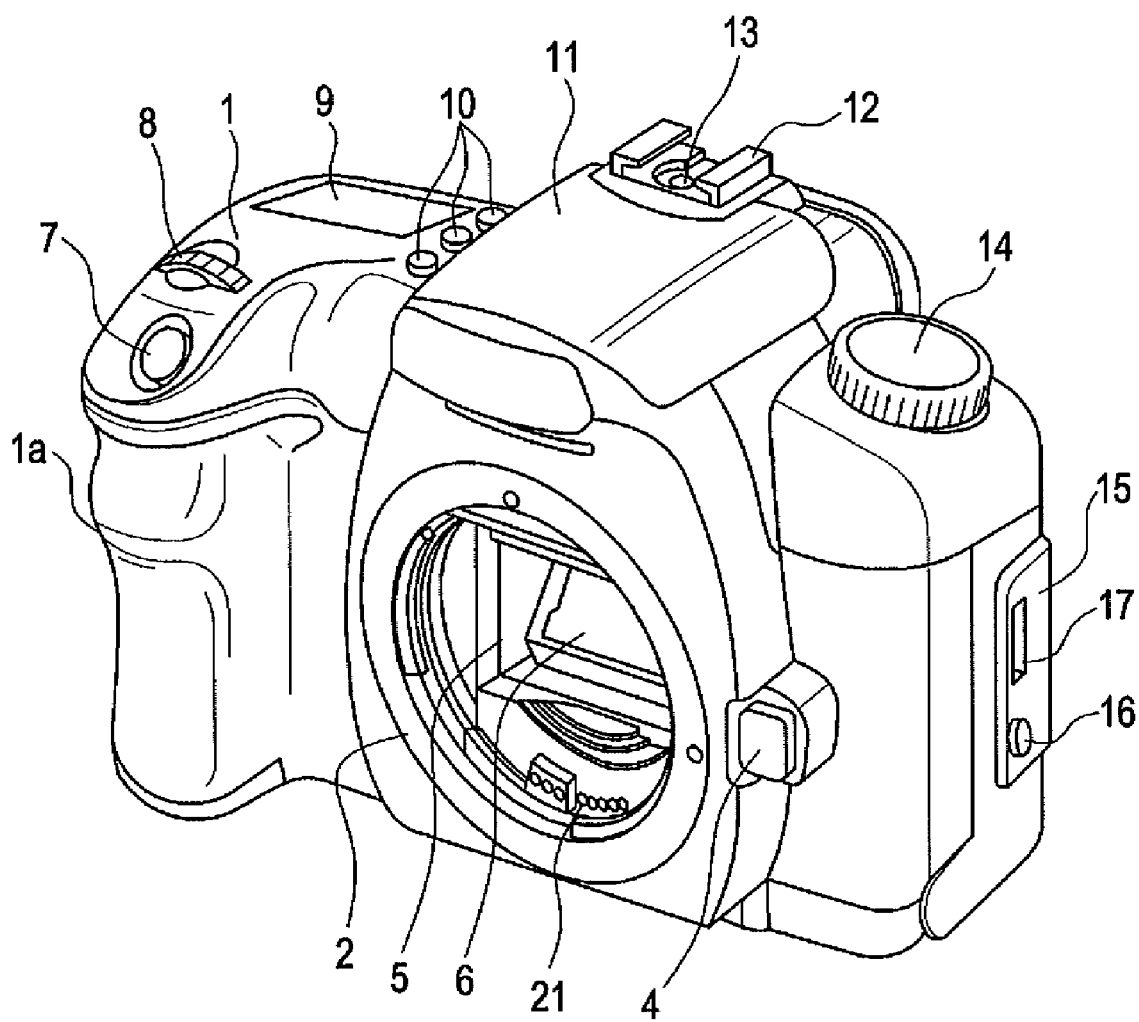
FIG. 1 is a front perspective view of a digital single-lens reflex camera according to an embodiment of the present invention.
Figure 2:
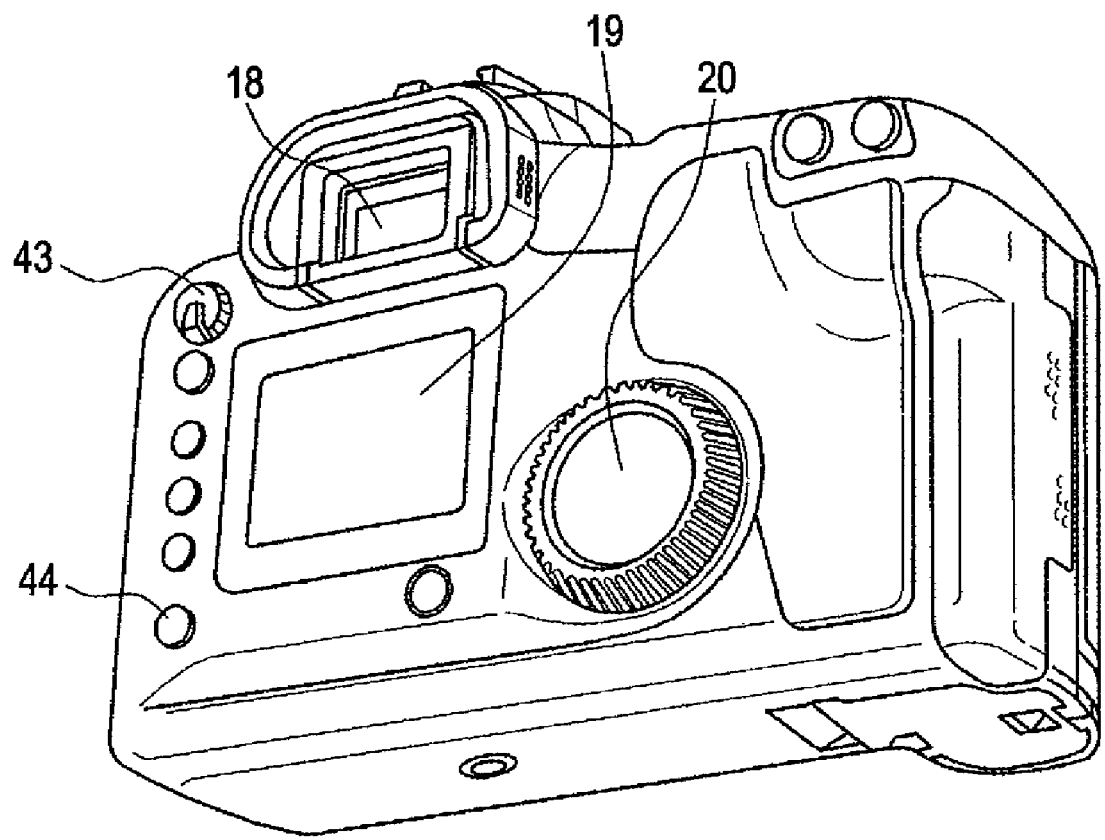
FIG. 2 is a rear perspective view of a digital single-lens reflex camera according to the embodiment of the present invention.

FIGS. 1 and 2 are external views of a digital single-lens reflex camera according to an embodiment of the present invention. FIG. 1 is a front perspective view of the digital single-lens reflex camera when viewed from the object side. FIG. 2 is a rear perspective view of the digital single-lens reflex camera when viewed from the photographer side.

As shown in FIG. 1, a camera body 1 has a grip portion 1a extending towards an object so that a photographer can stably hold the camera when taking a photo.

An objective taking lens unit (not shown in FIGS. 1 and 2) is removably mounted on a lens mount 2 of the camera body 1. A mount contact 21 allows the camera body 1 to exchange a control signal, a status signal, and a data signal with the objective taking lens unit. In addition, electrical power is supplied from the camera body 1 to the objective taking lens unit via the mount contact 21. The mount contact 21 may be configured so as to allow light communication and audio communication in addition to electrical communication between the camera body 1 and the objective taking lens unit. A lens lock release button 4 is disposed on the side surface of the lens mount 2. The lens lock release button 4 is pressed in order to remove the objective taking lens unit from the camera body 1.

The camera body 1 incorporates a mirror box 5 that leads an imaging light beam that has passed through the objective taking lens unit. The mirror box 5A includes a main mirror (quick-return mirror) 6. The main mirror 6 is disposed at an angle of 45° with respect to an imaging light axis so as to lead the imaging light beam to a penta-dach mirror 22 (see FIG. 3). The main mirror 6 can be moved away from that position to a position so that the imaging light beam is led to an image pickup element 33 (see FIG. 3).

A release button 7, a main operation dial 8, and a top operation mode setting button 10 are disposed on the upper surface of the camera body 1 on the side of the grip portion 1a. The release button 7 is used as a switch for starting an image capturing operation. The main operation dial 8 is used for setting a shutter speed and a lens aperture value in accordance with a mode of the image capturing operation. The top operation mode setting button 10 is used for determining various settings of an image pickup system. Some of the operation results of these operation members are displayed on an LCD panel 9. A first light touch of the release button 7 turns on a switch-SW1 7a (see FIG. 3) and a second light touch turns on a switch-SW2 7b (see FIG. 3). The top operation mode setting button 10 is used for determining whether one push of the release button 7 causes continuous shooting or single shooting. In addition, the top operation mode setting button 10 is used for setting a self-timer mode. The settings can be displayed on the LCD panel 9.

A strobe unit 11 that pops up from the camera body 1, a shoe groove 12 in which a flash unit is mounted, and a flash contact 13 are disposed on the upper surface of the camera body 1 in the central area.

A shooting mode setting dial 14 is disposed on the upper surface of the camera body 1 in the right area.

An openable cover 15 for covering external terminals is disposed on the side surface of the camera body 1 opposite to the side surface having the grip portion 1a thereon. Inside the cover 15, a video signal output jack 16 and a universal serial bus (USB) output connector 17 are disposed.

As shown in FIG. 2, a finder eyepiece 18 is disposed on a back surface of the camera body 1 in an upper area. In addition, a color liquid crystal monitor 19 is disposed on the back surface of the camera body 1 in substantially the central area. The color liquid crystal monitor 19 can display an image.

A sub operation dial 20 is disposed adjacent to the color liquid crystal monitor 19. The sub operation dial 20 plays an auxiliary role of the main operation dial 8. For example, in an AE mode of the camera, the sub operation dial 20 is used for setting an exposure correction value in order to change the exposure value from the optimal exposure value determined by an automatic exposure unit. In a manual mode in which a user determines a shutter speed and an aperture value of the lens, the shutter speed is determined by using the main operation dial 8 and the aperture value of the lens is determined by using the sub operation dial 20. In addition, the sub operation dial 20 is used for selecting a captured image to be displayed on the color liquid crystal monitor 19.

Furthermore, a main switch 43 for starting and stopping the operation of the camera and a cleaning instruction operation member 44 are disposed on the back surface of the camera. As described in more detail below, the cleaning instruction operation member 44 is used for instructing the camera to vibrate a lowpass filter so as to remove dust or dirt deposited on the surface of the lowpass filter.

Figure 3B:
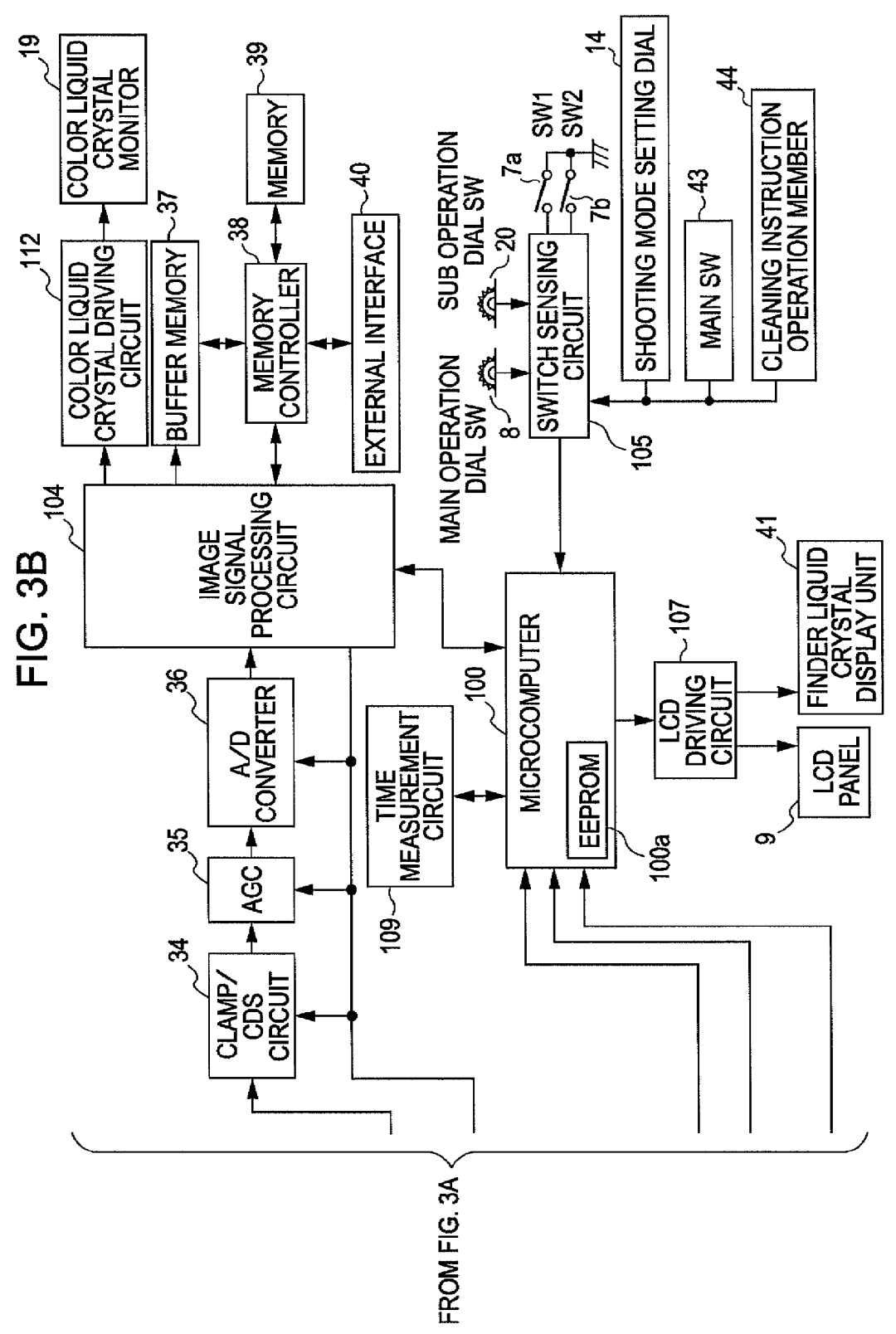

FIG. 3 is a block diagram of an exemplary electrical configuration of a digital single-lens reflex camera according to the present embodiment. Similar numbering will be used for describing similar components in FIG. 3 as was utilized above in describing FIGS. 1 and 2. A central processing unit (hereinafter referred to as an "MPU") 100 of a microcomputer incorporated in the camera body 1 performs overall control of the camera. The MPU 100 performs a variety of processing for components of the camera and processes a variety of instructions. An electrically erasable programmable read-only memory (EEPROM) 100a can store time information output from a time measurement circuit 109 and additional information.

A mirror driving circuit 101, a focus detection circuit 102, a shutter driving circuit 103, an image signal processing circuit 104, a switch sensing circuit 105, and a metering circuit 106 are connected to the MPU 100. In addition, an LCD driving circuit 107, a battery check circuit 108, the time measurement circuit 109, a power supply circuit 110, and a piezoelectric element driving circuit 111 are connected to the MPU 100. These circuits operate under the control of the MPU 100.

The MPU 100 communicates with a lens control circuit 201 in the objective taking lens unit via the mount contact 21. When the objective taking lens unit is mounted on the camera body 1, the mount contact 21 sends a signal to the MPU 100. Thus, the lens control circuit 201 communicates with the MPU 100 so as to drive an objective taking lens 200 and an aperture 204 disposed in the objective taking lens unit via an AF driving circuit 202 and an aperture driving circuit 203. Note that although, for simplicity, the objective taking lens unit includes only one objective taking lens 200 in FIG. 3, the objective taking lens unit can include a plurality of lens groups in practice.

The AF driving circuit 202 includes, for example, a stepping motor. The AF driving circuit 202 changes the position of a focus lens in the objective taking lens 200 using control performed by the lens control circuit 201 so that the imaging light beam is focused on the image pickup element 33. The aperture driving circuit 203 includes, for example, an auto iris. The aperture driving circuit 203 changes the aperture 204 using the lens control circuit 201 so that an optical aperture value is obtained.

As shown in FIG. 3, the main mirror 6 is disposed at an angle of 45° with respect to the imaging light axis and leads the imaging light beam that has passed through the objective taking lens 200 to the penta-dach mirror 22. In addition, the main mirror 6 allows a part of the imaging light beam to pass therethrough and leads the part of the imaging light beam to a sub-mirror 30. The sub-mirror 30 leads the part of the imaging light beam that has passed through the main mirror 6 to a focus detection sensor unit 31.

The mirror driving circuit 101 includes, for example, a DC motor and a gear train. The mirror driving circuit 101 drives the main mirror 6 to move to a position at which a user can observe an object image through a finder or a position at which the main mirror 6 moves away from the imaging light beam. When the main mirror 6 is driven, the sub-mirror 30 moves to a position at which the imaging light beam is led to the focus detection sensor unit 31 or a position at which the sub-mirror 30 moves away from the imaging light beam.

The focus detection sensor unit 31 includes a field lens disposed in the vicinity of an imaging plane (not shown), a reflecting mirror, a secondary imaging lens, an aperture, and a line sensor including a plurality of charge-coupled devices (CCDs). The focus detection sensor unit 31 performs focus detection using a phase difference method. A signal output from the focus detection sensor unit 31 is delivered to the focus detection circuit 102. Thereafter, the signal is converted to an object image signal and is delivered to the MPU 100. The MPU 100 performs a focus detection computation based on a phase difference method using the object image signal. Thus, the MPU 100 determines an amount of defocus and a defocus direction. Subsequently, the MPU 100 moves the focus lens in the objective taking lens 200 to a focal point through the lens control circuit 201 and the AF driving circuit 202 using the determined amount of defocus and defocus direction.

The penta-dach mirror 22 reflects the imaging light beam reflected off the main mirror 6 so that an erected image is formed. The photographer can observe the object image from the finder eyepiece 18 through the finder optical unit. In addition, the penta-dach mirror 22 leads a part of the imaging light beam to a metering sensor 23. Upon receipt of an output of the metering sensor 23, the metering circuit 106 converts the output to luminance signals of partitioned areas of the observation plane, which are output to the MPU 100. The MPU 100 computes the exposure value using the luminance signals.

A shutter (mechanical focal plane shutter) unit 32 blocks the imaging light beam when the camera is ready for shooting, that is, when the photographer views the object image through the finder. To capture the image, the shutter unit 32 operates in response to a release signal so that a desired exposure time period is obtained using a time difference between a time a first blade group (not shown) starts and a time a second blade group (not shown) starts. The shutter unit 32 is controlled by the shutter driving circuit 103 in response to an instruction from the MPU 100.

An image pickup unit 400 includes an optical lowpass filter 410, a piezoelectric element 430, and the image pickup element 33, which are integrated into one unit. The image pickup unit 400 will be described in more detail below.

Figure 6:
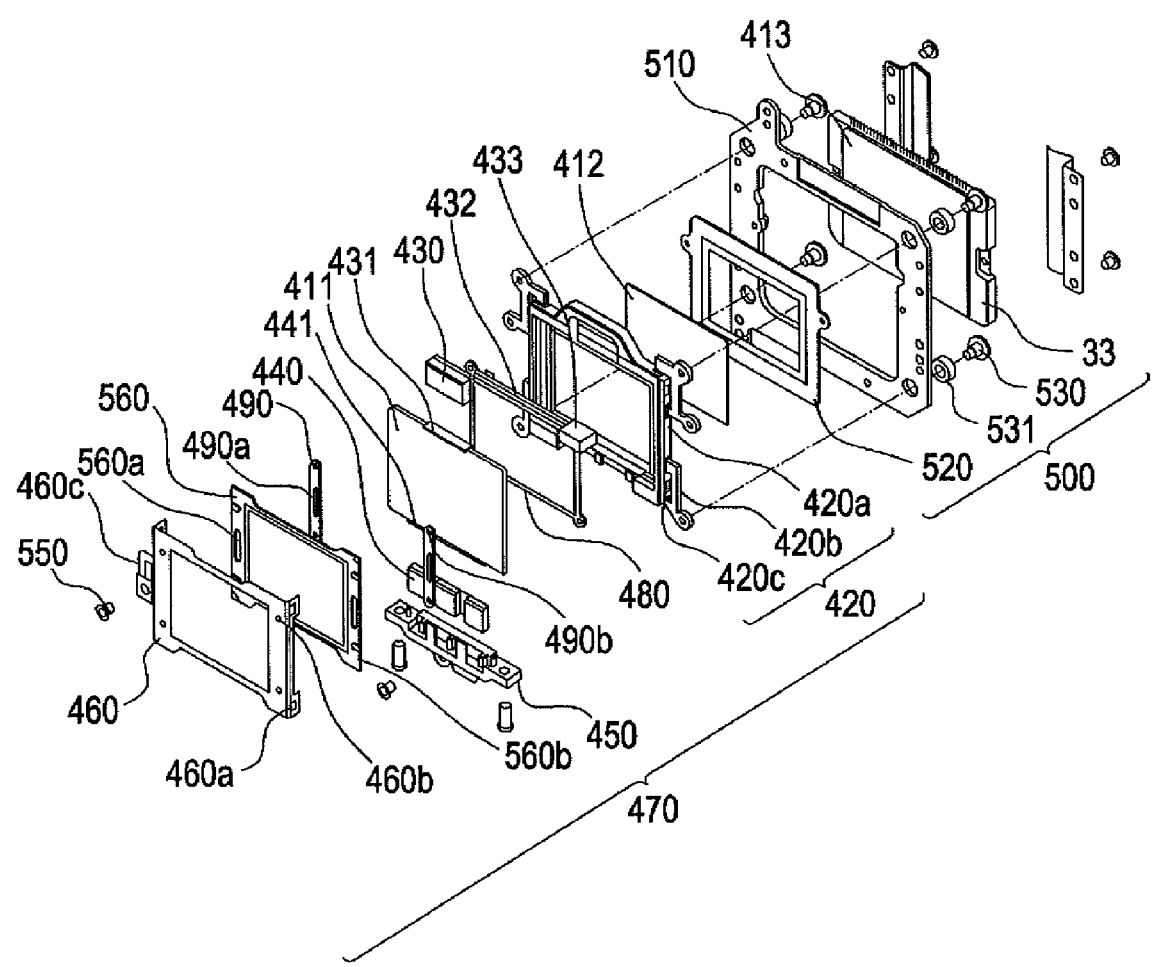
FIG. 6 is an exploded perspective view of the image pickup unit.

As shown in FIG. 6, the optical lowpass filter 410 is separated into a plurality of substantially rectangular members, that is, a first grouped optical member 411, a second grouped optical member 412, and a third grouped optical member 413. According to the present embodiment, the first grouped optical member 411 is formed from a quartz birefringent plate. The second grouped optical member 412 is formed from a phase plate laminated on infrared absorption glass. The third grouped optical member 413 is formed from a quartz birefringent plate. As used herein, the term "grouped" indicates that a member that seems to be a single one when externally viewed may have a layered structure. For example, the second grouped optical member 412 has a layered structure. Therefore, according to the present embodiment, although the first grouped optical member 411 is a quartz birefringent plate which is a monocrystalline plate, each of the second grouped optical member 412 and the third grouped optical member 413 may be a monocrystalline plate laminated on another monocrystalline plate or a monocrystalline plate laminated on a glass plate having no crystal structure. In addition, a coating providing certain optical functionality may be applied to the surface of each of the optical members 411 to 413. For example, to reflect an infrared light ray or an ultraviolet (UV) ray, $SiO_2$ and $TiO_2$ can be alternately coated on the surface of each of the grouped optical members 411 to 413.

The piezoelectric element 430 is driven by the piezoelectric element driving circuit 111 in response to an instruction from the MPU 100. The piezoelectric element 430 vibrates the first grouped optical member 411 which is a forefront member (closest to the object) in the optical lowpass filter 410.

According to the present embodiment, the image pickup element 33 is a CMOS image pickup device. However, a CCD may be used for the image pickup element 33. Any type of image pickup device can be used for the image pickup element 33.

A clamp/correlated double sampling (CDS) circuit 34 performs basic analog processing on a signal before the signal is A/D-converted. The clamp/CDS circuit 34 can change the clamp level. An automatic gain control (AGC) device 35 also performs basic analog processing on a signal before the signal is A/D-converted. The AGC device 35 can change even a basic AGC level. An analog-to-digital (A/D) converter 36 converts an analog signal output from the image pickup element 33 to a digital signal.

The image signal processing circuit 104 performs general hardware-based image processing, such as a gamma/knee process, a filtering process, and an information composing process for a monitor display, on digital image data. The image signal processing circuit 104 outputs image data for a monitor display. The image data is displayed on the color liquid crystal monitor 19 via a color liquid crystal driving circuit 112. In addition, the image signal processing circuit 104 can store the image data in a buffer memory 37 via a memory controller 38 in response to an instruction from the MPU 100. Furthermore, the image signal processing circuit 104 can compress the image data, for example, in a JPEG format. When images are continuously captured, as in a continuous shooting mode, the image signal processing circuit 104 temporarily stores the image data in the buffer memory 37, and subsequently, can sequentially read out the unprocessed image data from the buffer memory 37 via the memory controller 38. In this way, the image signal processing circuit 104 can sequentially perform image processing and compression processing regardless of the input speed of the image data input from the A/D converter 36.

The memory controller 38 stores image data input from an external interface 40 in a memory 39. In addition, the memory controller 38 outputs the image data stored in the memory 39 through the external interface 40. Note that the video signal output jack 16 and the USB output connector 17 shown in FIG. 1 correspond to the external interface 40. For example, a flash memory that is removably disposed in the camera body 1 is used for the memory 39.

The switch sensing circuit 105 transmits a signal input in accordance with the operating state of a switch to the MPU 100. The switch-SW1 7a is turned on by a first light touch of the release button 7. The switch-SW2 7b is turned on by a second light touch of the release button 7. When the switch-SW2 7b is turned on, an instruction to start shooting is transmitted to the MPU 100. The main operation dial 8, the sub operation dial 20, the shooting mode setting dial 14, the main switch 43, and the cleaning instruction operation member 44 are connected to the switch sensing circuit 105.

The LCD driving circuit 107 drives the LCD panel 9 and a finder liquid crystal display unit 41 in response to an instruction from the MPU 100.

The battery check circuit 108 checks the level of a battery in response to an instruction from the MPU 100 and transmits the checked level to the MPU 100. A power supply unit 42 supplies electrical power to each of the components of the camera.

The time measurement circuit 109 measures a time period from a time the main switch 43 is turned off to a time the main switch 43 is turned on and the date and time. The time measurement circuit 109 transmits the measured result to the MPU 100 in response to an instruction from the MPU 100.

Figure 4:
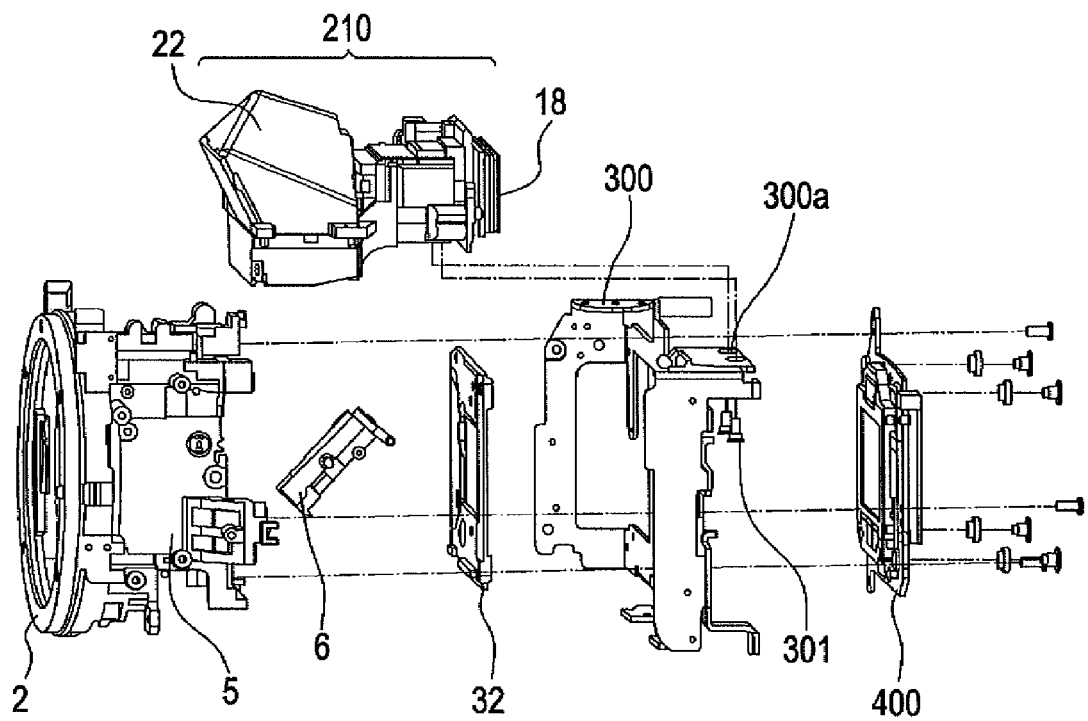
FIG. 4 is an exploded perspective view illustrating an exemplary internal structure of the digital single-lens reflex camera including an image pickup unit.

The image pickup unit 400 is described next. FIG. 4 is an exploded perspective view illustrating the internal structure of the camera including the image pickup unit 400. The shutter unit 32, a body chassis 300, which is a structural member of the camera body 1, and the image pickup unit 400 are assembled on the mirror box 5 in this order from the object side. The image pickup unit 400 is assembled on the mirror box 5 so that a distance between the imaging surface of the image pickup element 33 and a mounting surface of the lens mount 2, which is a mounting reference of the objective taking lens unit, is a predetermined value, and the imaging surface of the image pickup element 33 is parallel to the mounting surface of the lens mount 2. An eyepiece unit 210 including the penta-dach mirror 22 and the finder eyepiece 18 is disposed on the upper section of the body chassis 300. Thus, the photographer can view an optical image of an object led by the main mirror 6 and the penta-dach mirror 22 in the mirror box 5. The eyepiece unit 210 is mounted on an eyepiece-unit locking unit 300a and is locked by a locking member 301. The eyepiece-unit locking unit 300a is formed by bending the upper portion of the body chassis 300 and extending that portion.

Figure 5:
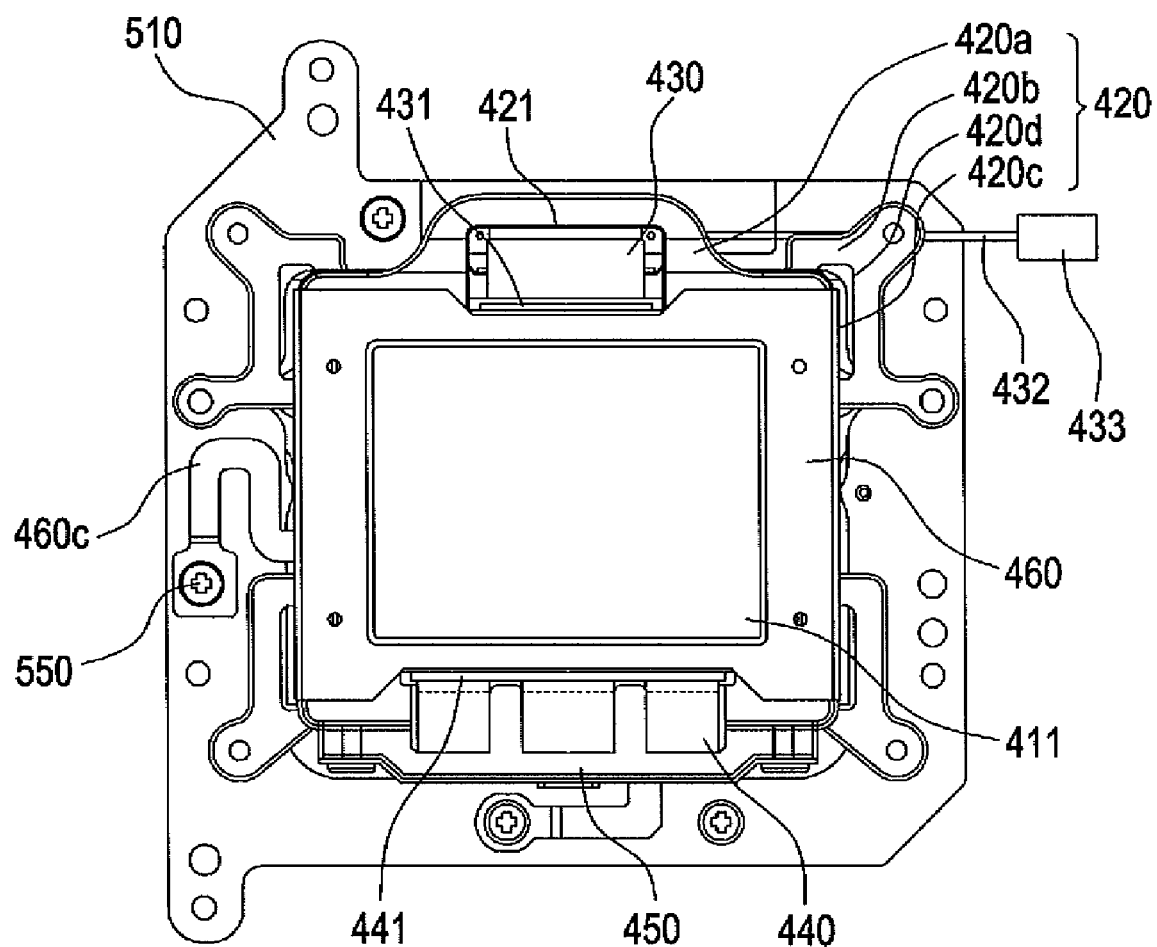
FIG. 5 is a front view of the image pickup unit.

FIG. 5 is a front view of the image pickup unit 400. FIG. 6 is an exploded perspective view of the image pickup unit 400. As shown in FIG. 6, the image pickup unit 400 includes an image pickup element unit 500 and a lowpass filter unit 470 as main components.

The image pickup element unit 500 includes at least the image pickup element 33 and an image pickup element holding member 510. The lowpass filter unit 470 includes at least the first grouped optical member 411, a lowpass filter holding member 420, the piezoelectric element 430, a vibration transfer member 431, a biasing member 440, a biasing force transfer member 441, a first resilient member 480, a second resilient member 490, a regulation member 460, and a mask member 560.

In the image pickup element unit 500, the image pickup element holding member 510 is a plate having a substantially rectangular opening. The image pickup element 33 is fixed to the image pickup element holding member 510 so that the imaging plane of image pickup element 33 is exposed through the opening. To fix the image pickup element holding member 510 to the mirror box 5 by means of screws, an arm portion is formed so as to extend from the periphery of the image pickup element holding member 510. The image pickup element holding member 510 is fixed to the mirror box 5 by means of screws at three points.

In the lowpass filter unit 470, the lowpass filter holding member 420 has a frame-like shape and is formed from resin or metal. The first grouped optical member 411 is attached to a frame portion 420a of the lowpass filter holding member 420. In this case, the first resilient member 480 having a ring shape is disposed between the lowpass filter holding member 420 and the first grouped optical member 411. An arm portion 420b is integrally formed at each of the four corners of the lowpass filter holding member 420. Thus, the lowpass filter holding member 420 is attached to the image pickup element holding member 510 and is supported by the image pickup element holding member 510.

To hold the piezoelectric element 430, a container portion 421 is formed on one of the four sides (an upper side) of the frame portion 420a of the lowpass filter holding member 420. One end surface of the piezoelectric element 430 is bonded to the frame portion 420a by an adhesive agent so that a direction in which the piezoelectric element 430 extends when a voltage is applied thereto is perpendicular to the imaging light axis (i.e., the vertical direction of the camera). The piezoelectric element 430 is electrically connected to the piezoelectric element driving circuit 111 via a lead wire 432 and a connector 433.

The vibration transfer member 431 is sandwiched by the piezoelectric element 430 and the first grouped optical member 411 and is bonded to the first grouped optical member 411. In this case, the piezoelectric element 430 is not fixed to the vibration transfer member 431 that is fixed to the first grouped optical member 411. The piezoelectric element 430 is only in contact with the vibration transfer member 431. The material, shape, and effect of the vibration transfer member 431 are described later with reference to FIGS. 12A and 12B.

The biasing member 440 that is held by a biasing-member holding unit 450 is attached to one of four sides (a lower side) of the frame portion 420a of the lowpass filter holding member 420. The lower side is opposite to the side on which the container portion 421 is formed. The biasing member 440 urges the first grouped optical member 411 towards the piezoelectric element 430.

The biasing force transfer member 441 is sandwiched by the biasing member 440 and the first grouped optical member 411. The biasing force transfer member 441 is bonded to the first grouped optical member 411. The material, shape, and effect of the biasing force transfer member 441 are described later with reference to FIGS. 12A and 12B.

That is, the first grouped optical member 411 is disposed so as to be sandwiched by the piezoelectric element 430 and the biasing member 440 in the same plane via the vibration transfer member 431 and the biasing force transfer member 441, respectively. Due to such an arrangement, the first grouped optical member 411 can move while following the expansion and contraction of the piezoelectric element 430.

The piezoelectric element 430 is a layered piezoelectric element in which a piezoelectric member and an internal electrode are alternately layered. The piezoelectric element 430 is disposed so as to be in contact with the vibration transfer member 431. More specifically, a d33-type layered piezoelectric element is employed. For a d33-type layered piezoelectric element, a voltage is applied in a direction in which the piezoelectric members are layered. Accordingly, a large amplitude (a large displacement) can be obtained in the layer direction, and therefore, the first grouped optical member 411 can be largely displaced in the layer direction. Alternatively, a variety of types of piezoelectric elements can be used. That is, any piezoelectric element that can displace the optical lowpass filter 410 in a direction parallel to the plane of the optical lowpass filter 410 (a direction perpendicular to the imaging light axis) can be used.

Figure 9A:
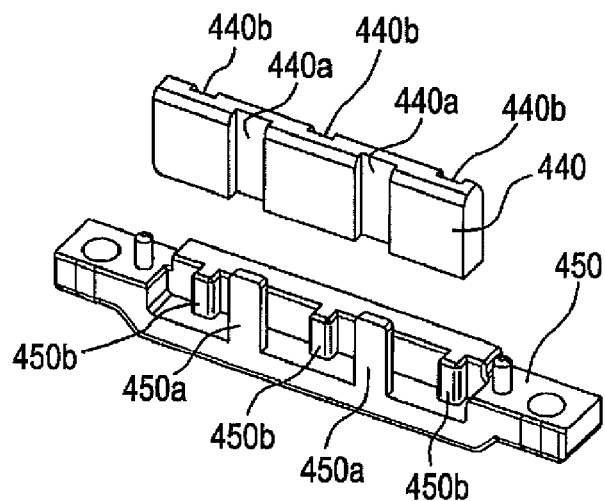
FIG. 9A is a perspective view of a biasing member and a biasing-member holding unit when viewed from an object side before the biasing member and the biasing-member holding unit are assembled together.
Figure 9B:
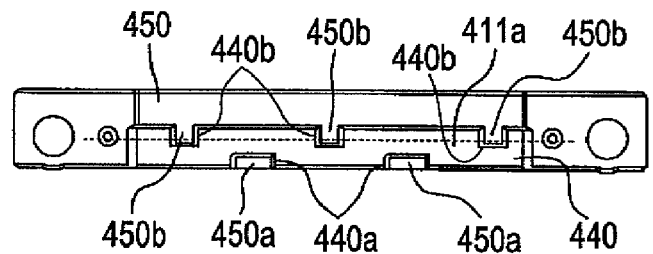
FIG. 9B is a top view of the biasing member and the biasing-member holding unit after the biasing member and the biasing-member holding unit are assembled together.
Figure 9C:
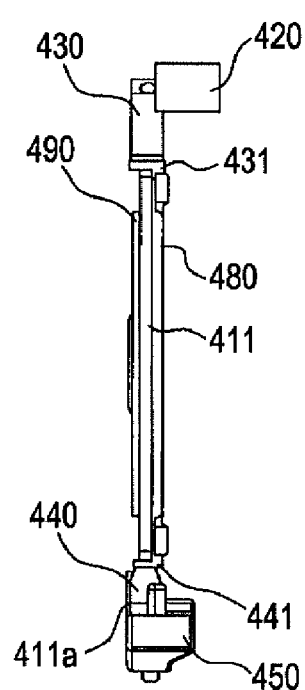
FIGS. 9C and 9D are side views illustrating a relationship between the biasing member and the piezoelectric element.
Figure 9D:
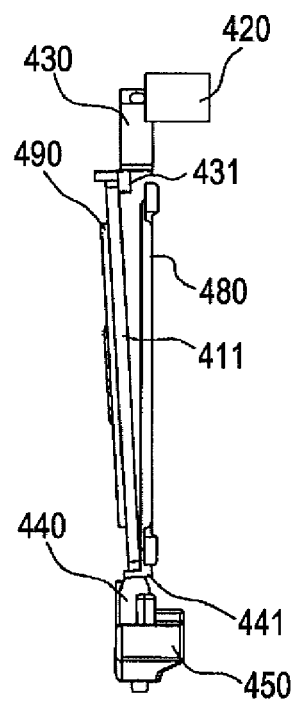

The biasing member 440 is a block-shaped resilient member. The biasing member 440 is disposed so as to face the piezoelectric element 430 and be in contact with the biasing force transfer member 441. The biasing member 440 is supported by the biasing-member holding unit 450. FIG. 9A is a perspective view of the biasing member 440 and the biasing-member holding unit 450 when viewed from the object side before the biasing member 440 and the biasing-member holding unit 450 are assembled together. FIG. 9B is a top view of the biasing member 440 and the biasing-member holding unit 450 after the biasing member 440 and the biasing-member holding unit 450 are assembled together. FIGS. 9C and 9D are side views illustrating a relationship between the biasing member 440 and the piezoelectric element 430.

As shown in FIGS. 9A and 9B, protrusions 450a are formed on the surface of the biasing-member holding unit 450 on the object side at two locations. Depressions 440a are formed on the surface of the biasing member 440 on the object side at two locations. The protrusions 450a of the biasing-member holding unit 450 are engaged with the depressions 440a of the biasing member 440. When the biasing member 440 is assembled to the biasing-member holding unit 450, the position of the biasing member 440 can be determined by engaging the protrusions 450a with the depressions 440a. In addition, by providing the protrusions 450a, when the biasing member 440 is pressed and deformed, the deformation of the biasing member 440 does not interfere with the shutter unit 32 disposed on the object side of the biasing member 440.

Additionally, depressions 440b are formed on the surface of the biasing member 440 on the photographer side at three locations. The reason why the depressions 440b are formed on the surface of the biasing member 440 on the photographer side is to keep cross-sectional areas perpendicular to a biasing direction on the front and rear side (the object side and the photographer side) of a center plane 411a of the first grouped optical member 411, where the plane 411a is perpendicular to the imaging light axis, the same as the cross-sectional area of the center plane 411a. In contrast, protrusions 450b are formed on the biasing-member holding unit 450 at three locations. The protrusions 450b can be engaged with the depressions 440b.

In the case where a cross-sectional area of the biasing member 440 that is perpendicular to the biasing direction changes on the front and rear sides of the center plane 411a, when, as shown in FIG. 9D, the biasing member 440 is pressed by the biasing force transfer member 441, amounts of contraction of the biasing member 440 are different on the object side and the photographer side. Accordingly, the biasing force transfer member 441 is tilted in the biasing direction, and therefore, the first grouped optical member 411 is tilted with respect to the lowpass filter holding member 420 and the first resilient member 480. If the first grouped optical member 411 is largely tilted, a space is generated between the first grouped optical member 411 and the first resilient member 480 or between the lowpass filter holding member 420 and the first resilient member 480. Thus, a foreign substance may disadvantageously enter inside the camera through the space.

In contrast, according to the present embodiment, the cross-sectional areas of the biasing member 440 are substantially the same on the front and rear sides of the center plane 411a. Therefore, as shown in FIG. 9C, even when the biasing member 440 is pressed by the biasing force transfer member 441, the amounts of contraction of the biasing member 440 are substantially the same on the front and rear sides. Consequently, the first grouped optical member 411 is not largely tilted with respect to the lowpass filter holding member 420 and the first resilient member 480. As a result, the interfaces between the first grouped optical member 411 and the first resilient member 480 and between the lowpass filter holding member 420 and the first resilient member 480 can be sealed, thus preventing a foreign substance, such as dust or dirt, from entering inside the camera.

According to the present embodiment, the biasing member 440 is made from a rubber. However, the biasing member 440 may be made from any resilient material. For example, the biasing member 440 may be made from a high molecular weight polymer, such as rubber or plastic. Alternatively, the biasing member 440 may be made from a metal leaf spring or a metal coil spring. Alternatively, the lowpass filter holding member 420 may be resilient so that the first grouped optical member 411 moves while following the expansion and contraction of the piezoelectric element 430.

Referring back to FIGS. 5 and 6, the first resilient member 480 disposed between the lowpass filter holding member 420 and the first grouped optical member 411 is formed from an elastomer (a polymeric material). The first resilient member 480 allows the first grouped optical member 411 to vibrate while following the expansion and contraction of the piezoelectric element 430. In addition, the first resilient member 480 prevents the first grouped optical member 411 from being damaged by the vibration. The interface between the first grouped optical member 411 and the lowpass filter holding member 420 is sealed at the four sides using the first resilient member 480.

The first grouped optical member 411 is supported by the first resilient member 480 and the second resilient member 490, which is described in more detail below, so as to move in the imaging light axis direction within a predetermined range. That is, when the first grouped optical member 411 receives the vibration of the piezoelectric element 430, the first grouped optical member 411 is allowed to tilt from a plane perpendicular to the imaging light axis at an angle of a few degrees. Since an inclination of a few degrees is allowed, a foreign substance deposited on the surface of the first grouped optical member 411 is subjected to acceleration in the imaging light axis direction. Thus, the foreign substance can be further easily removed.

However, in the case where an inclination of the first grouped optical member 411 is allowed with respect to a plane perpendicular to the imaging light axis, if the piezoelectric element 430 is bonded and fixed to the first grouped optical member 411, a shearing stress is generated in the piezoelectric element 430. In particular, since a layered piezoelectric element is used in the present embodiment, the shearing stress easily damages the piezoelectric element.

To address this issue, the surface (vibration surface) of the piezoelectric element 430 that is in contact with the first grouped optical member 411 (the vibration transfer member 431) is not bonded to the first grouped optical member 411 (the vibration transfer member 431). That is, the surface (vibration surface) of the piezoelectric element 430 is only in contact with the first grouped optical member 411 (the vibration transfer member 431). In this way, even when the biasing force transfer member 441 is tilted from a plane perpendicular to the imaging light axis, a shearing stress is not applied to the piezoelectric element 430. This is because when the first grouped optical member 411 is tilted, the contact surface of the piezoelectric element 430 is only shifted from the contact surface of the first grouped optical member 411 (the vibration transfer member 431) in terms of position, and a rotation force is not directly applied to the piezoelectric element 430.

However, when the contact surface of the piezoelectric element 430 is not bonded to the contact surface of the first grouped optical member 411 (the vibration transfer member 431), the compliance of the first grouped optical member 411 in response to the vibration of the piezoelectric element 430 disadvantageously deteriorates.

To address this issue, as noted above, the first grouped optical member 411 is disposed so as to be sandwiched by the piezoelectric element 430 and the biasing member 440 in the same plane. That is, by urging the first grouped optical member 411 from the opposite side of the piezoelectric element 430, the first grouped optical member 411 (the vibration transfer member 431) is in contact with the piezoelectric element 430 even when the piezoelectric element 430 is driven in a direction in which the piezoelectric element 430 contracts.

Such a structure provides excellent compliance of the first grouped optical member 411 in response to the vibration of the piezoelectric element 430 without damaging the piezoelectric element 430 caused by an occurrence of a shearing stress.

As shown in FIG. 6, the regulation member 460 is disposed on the object side of the first grouped optical member 411. In this case, the mask member 560 for blocking an unwanted light beam and two second resilient members 490 are disposed between the first grouped optical member 411 and the regulation member 460. The two second resilient members 490 are in contact with either side of the surface of the first grouped optical member 411.

The mask member 560 has an opening through which the first grouped optical member 411 is exposed. The mask member 560 prevents the imaging light beam from entering an area other than the opening. Thus, the imaging light beam is not made incident on the image pickup element 33 from the peripheral portion of the first grouped optical member 411, and therefore, an occurrence of ghosting caused by a reflected light beam can be prevented.

The second resilient member 490 urges the first grouped optical member 411 towards the lowpass filter holding member 420. Like the first resilient member 480, the second resilient member 490 is formed from an elastomer. The second resilient member 490 allows the first grouped optical member 411 to tilt from a plane perpendicular to the imaging light beam, but restricts the inclination of the first grouped optical member 411 to be equal to or less than predetermined angle. In addition, the second resilient member 490 prevents the first grouped optical member 411 from being damaged by the vibration.

The regulation member 460 is formed from, for example, a conductive metallic plate. Like the mask member 560, the regulation member 460 has an opening through which the first grouped optical member 411 is exposed. Either side of the regulation member 460 is extended and is bent to form a latching tip. A latching hole 460a is formed in each of the latching tip. By engaging the latching hole 460a with a claw member 420c formed on the side surface of the lowpass filter holding member 420, the regulation member 460 can be assembled to the lowpass filter holding member 420. Thus, the regulation member 460 restricts the motion of the first grouped optical member 411 in the imaging light axis direction. That is, the regulation member 460 prevents the first grouped optical member 411 from moving outside the lowpass filter unit 470 and from tilting at a predetermined angle or more for any reason.

In addition, an arm portion 460c of the regulation member 460 is secured to the image pickup element holding member 510 by a screw 550. The arm portion 460c has a rectangular shape having a width less than or equal to a half of the length thereof. The arm portion 460c is curved at a middle portion in the length direction. Such a structure prevents the vibration of the first grouped optical member 411 that follows the expansion and contraction of the piezoelectric element 430 from being directly transferred to the image pickup element holding member 510.

The image pickup element holding member 510 is grounded to the body chassis 300 via a grounding member (not shown). Accordingly, by forming the image pickup element holding member 510 and the body chassis 300 using a conductive material, such as a metal, the regulation member 460 can be grounded to a potential that is the same as that of the body chassis 300 via the arm portion 460c.

Furthermore, the second resilient member 490 is formed from a resilient and electrically conductive elastomer. A protrusion 490a is formed on the surface of the second resilient member 490 that is in contact with the mask member 560. An opening 560a is formed in the mask member 560 so as to correspond to the protrusion 490a formed on the second resilient member 490. An adhesive layer is formed on each of the entire first and second surfaces of the mask member 560.

The mask member 560 is positioned so that a positioning reference hole 560b is aligned with a positioning reference hole 460b of the regulation member 460. Thereafter, the mask member 560 is bonded to the regulation member 460. In addition, the second resilient member 490 is positioned so that a positioning reference hole 490b is aligned with the positioning reference hole 560b of the mask member 560, so that the positioning reference hole 490b is aligned with the positioning reference hole 460b of the regulation member 460. Thereafter, the second resilient member 490 is bonded to the mask member 560.

In this case, since the protrusion 490a of the second resilient member 490 is formed at a location corresponding to the position of the opening 560a of the mask member 560, the protrusion 490a extends through the opening 560a and contacts the regulation member 460. That is, the second resilient member 490 is grounded to a potential that is the same as that of the body chassis 300 via the protrusion 490a and the regulation member 460.

Consequently, the surface of the first grouped optical member 411 that is in contact with the second resilient member 490 is grounded, and therefore, an attraction force caused by static electrical charge that attracts dust or dirt to the surface of the first grouped optical member 411 is decreased. As a result, a foreign substance, such as dust or dirt, deposited on the surface of the first grouped optical member 411 can be easily removed using the vibration of the first grouped optical member 411 that follows the extraction and contraction of the piezoelectric element 430.

As shown in FIG. 6, the second grouped optical member 412, one of the components of the lowpass filter unit 470, is assembled on the lowpass filter holding member 420 on the photographer side and is bonded to the lowpass filter holding member 420. In this way, the second grouped optical member 412 is assembled on the lowpass filter holding member 420 on the side opposite to the first grouped optical member 411 so that a certain distance is provided between the second grouped optical member 412 and the first grouped optical member 411. Thus, the vibration of the first grouped optical member 411 is not affected by the second grouped optical member 412. In addition, because the first grouped optical member 411 and the second grouped optical member 412 are assembled on the same component (i.e., the lowpass filter holding member 420), the number of components can be reduced, and therefore, the possibility of a foreign substance entering inside the camera due to a large number of sealing parts can be reduced.

The lowpass filter unit 470 and the image pickup element unit 500 is connected with a rubber sheet 520 therebetween using a step screw 530. A surface of the rubber sheet 520 on the side of the image pickup element unit 500 is in tight contact with the third grouped optical member 413, which is in tight contact with the imaging surface of the image pickup element 33 and is secured to the imaging surface. A surface of the rubber sheet 520 on the side of the lowpass filter unit 470 is in tight contact with the frame portion 420a of the lowpass filter holding member 420. Thus, a space between the lowpass filter holding member 420 and the third grouped optical member 413 is sealed by the rubber sheet 520. A space between the first grouped optical member 411 and the lowpass filter holding member 420 is sealed by the first resilient member 480. Accordingly, a space formed between the first grouped optical member 411 and the image pickup element 33 is sealed so that entrance of a foreign substance, such as dust or dirt, can be prevented.

The step screw 530 connects the arm portion 420b of the lowpass filter holding member 420 with the image pickup element holding member 510 with a step-screw rubber bush 531 therebetween.

As noted above, the lowpass filter unit 470 is connected to the image pickup element unit 500 via the rubber sheet 520 and the step-screw rubber bush 531. Thus, the lowpass filter unit 470 and the image pickup element unit 500 floatingly support each other through the elasticity of the rubber sheet 520 and the step-screw rubber bush 531. Accordingly, the vibration of the piezoelectric element 430 is not transferred to the image pickup element unit 500.

While the present embodiment has been described with reference to the rubber sheet 520, the present invention is not limited thereto. Any material having air-tightness that prevents a foreign substance, such as dust or dirt, from entering inside the camera and vibration absorption characteristic that prevents the vibration of the piezoelectric element 430 from being transferred to the image pickup element 33 can be employed. For example, a two-sided adhesive sponge tape or a gel sheet having a certain thickness can be employed.

Figure 7:
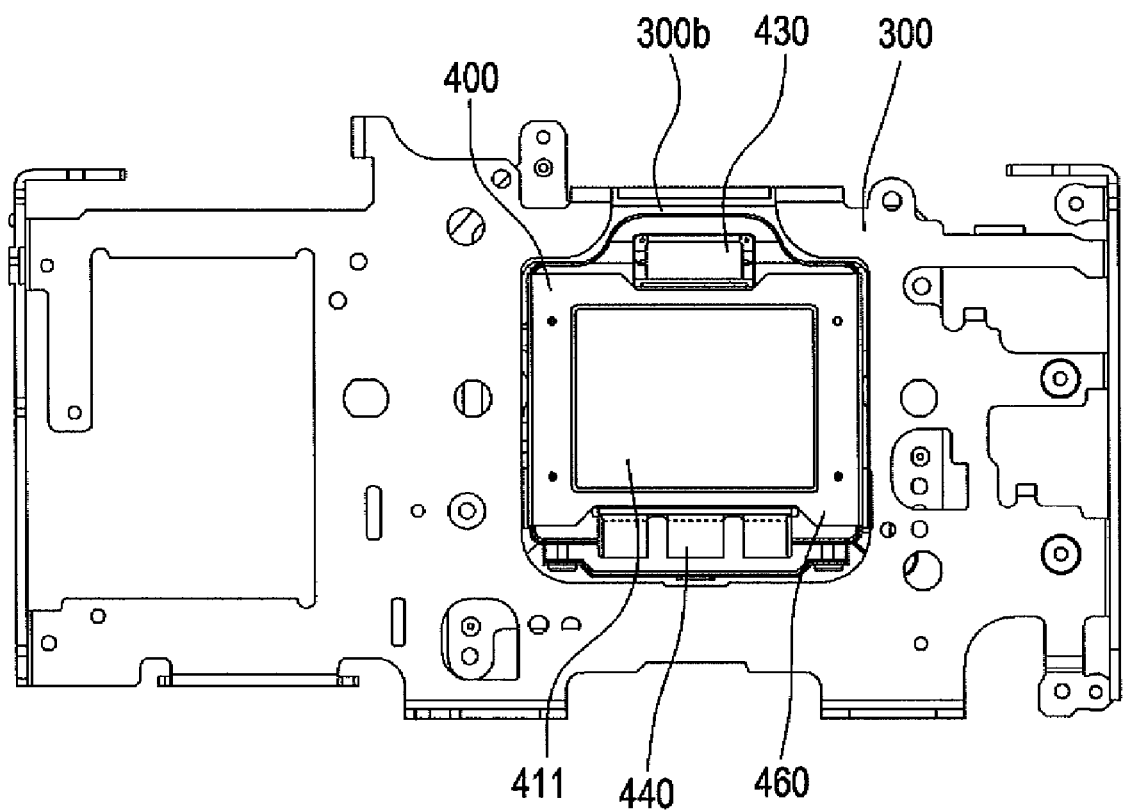
FIG. 7 is a front view illustrating a positional relationship between the image pickup unit and a body chassis.
Figure 8:
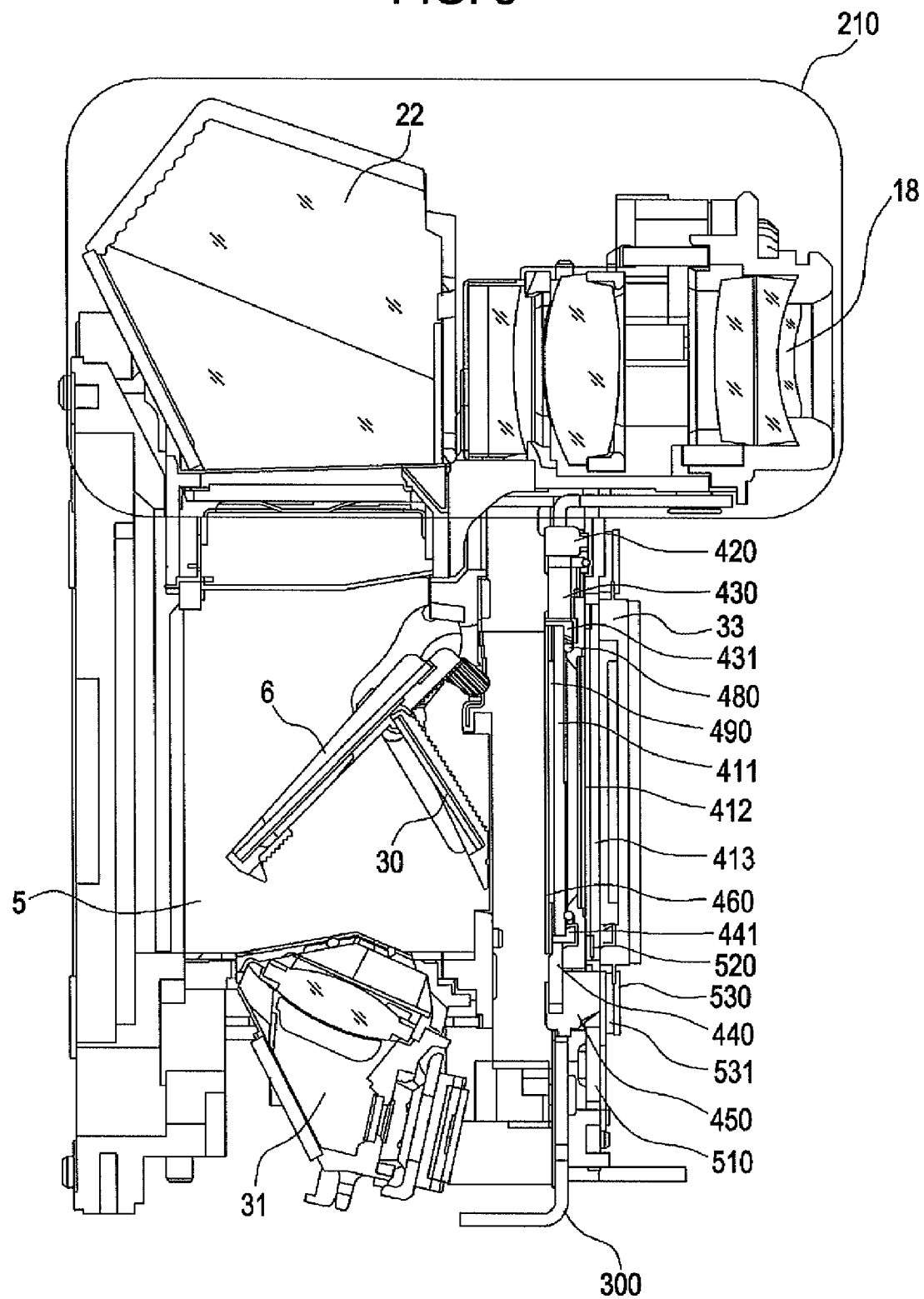
FIG. 8 is a longitudinal cross-sectional view of a camera including the image pickup unit.

FIG. 7 is a front view illustrating a positional relationship between the image pickup unit 400 and the body chassis 300. FIG. 8 is a longitudinal cross-sectional view of a camera including the image pickup unit 400. As shown in FIGS. 7 and 8, the lowpass filter unit 470 including the first grouped optical member 411, the piezoelectric element 430, the vibration transfer member 431, the biasing member 440, and the biasing force transfer member 441 is disposed at a location substantially the same as that of the body chassis 300 in the imaging light axis direction. The body chassis 300 has a body chassis opening 300b formed therein. The lowpass filter unit 470 is disposed at a location separated from the body chassis opening 300b by a predetermined distance. That is, as illustrated in FIG. 4, the body chassis 300 is attached to the mirror box 5. In addition, the image pickup unit 400 is attached to the mirror box 5. Accordingly, the body chassis 300 is separated from the image pickup unit 400 by the body chassis opening 300b. Therefore, the body chassis 300 is not directly in contact with the image pickup unit 400. Thus, the imaging surface of the image pickup element 33 can be directly adjusted so as to be separated from the mounting surface of the lens mount 2, which is a mount reference of the objective taking lens unit, and so as to be parallel to the mounting surface of the lens mount 2. In addition, an external force applied to the body chassis 300 via an outer cover member is not directly applied to the image pickup unit 400. Furthermore, since the lowpass filter unit 470 and the body chassis 300 are disposed at substantially the same location in the imaging light axis direction, the size of the camera in the thickness direction (the imaging light axis direction) can be decreased.

The piezoelectric element 430 is disposed on the first grouped optical member 411 at a position on the side of the eyepiece unit 210 (the upper side) from the imaging light axis. The biasing member 440 is disposed on the first grouped optical member 411 at a position facing the piezoelectric element 430 (on the lower side).

To obtain stable vibration of the first grouped optical member 411, the biasing force of the biasing member 440 should be uniform. To obtain a uniform biasing force, it is effective to reduce a spring constant of the biasing member 440 when considering dimensional tolerances of the components. Furthermore, to generate a biasing force that can make the vibration of the first grouped optical member 411 stable, the size of the biasing member 440 tends to be increased, compared with the piezoelectric element 430.

Connectors and a battery container (neither is shown) are disposed at positions close to the image pickup unit 400 in a horizontal direction (a left-right direction) of the camera in the vicinity of the image pickup unit 400. Accordingly, if the piezoelectric element 430 and the biasing member 440 are arranged on the first grouped optical member 411 in the horizontal direction of the camera, the size of the camera body 1 may be increased in the horizontal direction.

In contrast, as shown in FIG. 8, in widely used single-lens reflex cameras, in the vicinity of the image pickup unit 400 in a vertical direction of the camera, although the eyepiece unit 210 is located immediately above the image pickup unit 400 and close to the image pickup unit 400, a space can be easily provided immediately beneath the image pickup unit 400. This is because the focus detection sensor unit 31 that performs focus detection using the imaging light beam led by the sub-mirror 30 is disposed on the opposite side of the imaging light axis from the eyepiece unit 210, and the focus detection sensor unit 31 is contained in the lower section of the mirror box 5 and beneath substantially the center of the mirror box 5.

Accordingly, by disposing the piezoelectric element 430 having a small volume in the section on the side of the eyepiece unit 210 (in the upper section) and disposing the biasing member 440 having a large volume in the lower section, an increase in the volume above the body chassis opening 300b can be minimized. Thus, the rigidity and strength of the body chassis 300 can be efficiently maintained, and therefore, the rigidity and strength of the camera body 1 can be maintained. Furthermore, an increase in the height of the eyepiece-unit locking unit 300a can be prevented while maintaining the body supporting rigidity and strength of the eyepiece unit 210.

Consequently, the sizes of the camera in the vertical direction and the horizontal direction can be reduced.

The vibration of the first grouped optical member 411, which is one of the components of the optical lowpass filter 410, is described next. When the MPU 100 serving as a control unit performs control so as to apply a predetermined periodic voltage to the piezoelectric element 430, the piezoelectric element 430 vibrates such that the piezoelectric element 430 expands and contracts in the vertical direction of the camera, which is a direction perpendicular to the imaging light axis. As shown in FIG. 9C, the vibration transfer member 431 and the biasing force transfer member 441 are bonded and secured to the first grouped optical member 411. The first grouped optical member 411 is disposed so as to be sandwiched by the piezoelectric element 430 and the biasing member 440 in a direction in the same plane. Accordingly, the first grouped optical member 411 is in contact with the piezoelectric element 430 via the vibration transfer member 431 at all times. Thus, the vibration of the piezoelectric element 430 is transferred to the first grouped optical member 411.

Figure 10:
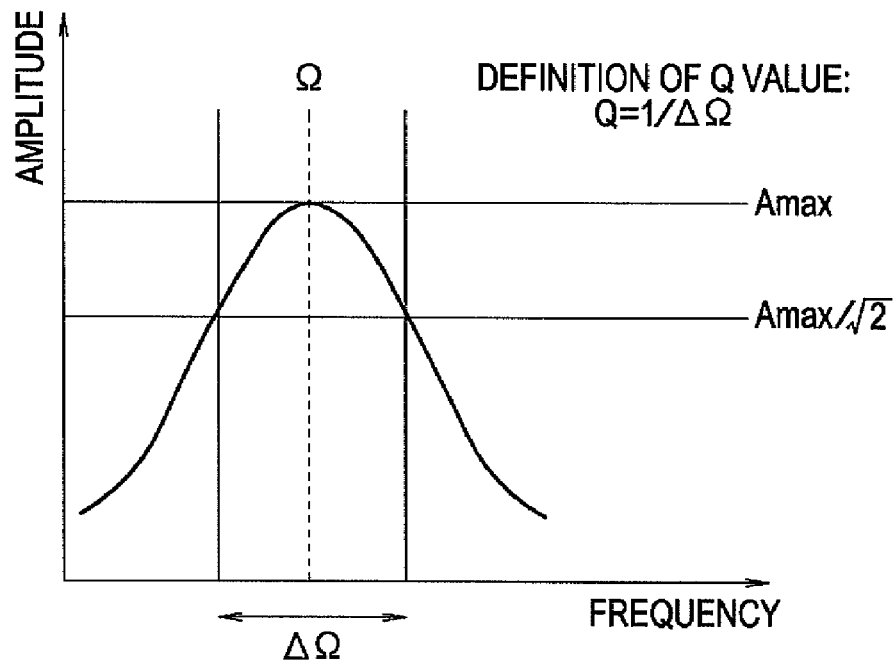
FIG. 10 is a concept diagram illustrating a Q value.

According to the present embodiment, the first grouped optical member 411, which is a vibrated member, is a quartz birefringent plate having a monocrystalline structure. Since quartz has a crystal structure, quartz has a high Q value that indicates the sharpness of resonance compared with glass, which is an amorphous material. Thus, the vibration is not easily attenuated. That is, by using the first grouped optical member 411 formed from a quartz birefringent plate, the first grouped optical member 411 can be more efficiently vibrated than that formed from glass. Therefore, most foreign substances, such as dust or dirt, deposited on the surface of the first grouped optical member 411 can be efficiently removed. As can be seen from a concept diagram of a Q value shown in FIG. 10, the Q value is expressed by the following equation:

$$Q = 1/\Delta\Omega \quad (1)$$

That is, let $A_{max}$ denote the amplitude of vibration at a resonance frequency $\Omega$. Then, the Q value is defined as an inverse of a frequency width having an amplitude greater than or equal to $A_{max}/\sqrt{2}$.

Figure 11:
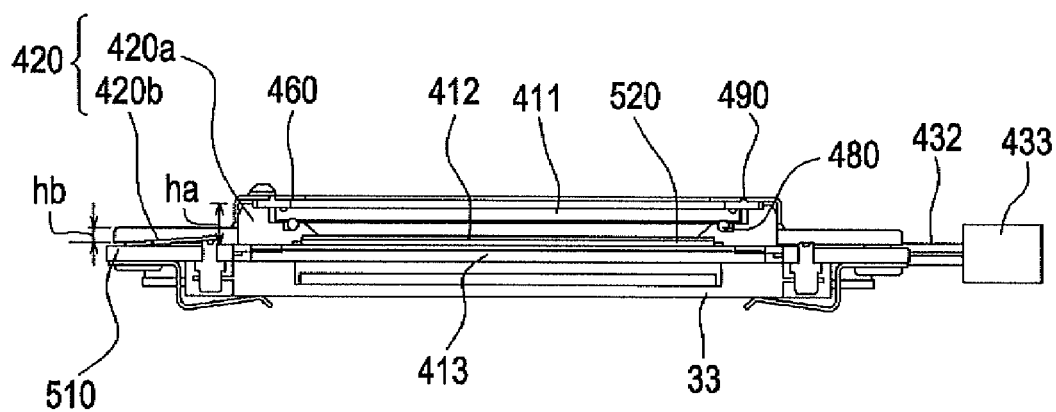
FIG. 11 is a transverse cross-sectional view of the image pickup unit.

FIG. 11 is a transverse cross-sectional view of the image pickup unit 400. As shown in FIG. 11, the lowpass filter holding member 420 includes the frame portion 420a surrounding the first grouped optical member 411 and the four arm portions 420b for mounting the lowpass filter holding member 420 on the image pickup element holding member 510 that supports the lowpass filter holding member 420. A thickness ha of the frame portion 420a is greater than a thickness hb of the arm portions 420b. The cross-sectional bending rigidity of the frame portion 420a is higher than that of the arm portions 420b. That is, the characteristic resonance frequency of the frame portion 420a is higher than that of the arm portions 420b. Accordingly, when the piezoelectric element 430 vibrates the first grouped optical member 411 at around the characteristic resonance frequency of the frame portion 420a, the effect of the arm portions 420b having a low characteristic resonance frequency is small. Thus, the piezoelectric element 430 can efficiently vibrate the first grouped optical member 411.

According to the present embodiment, each of the arm portions 420b located at one of four locations has a bridge shape so that the claw member 420c formed on the side surface of the lowpass filter holding member 420 does not interfere with the arm portion 420b. In addition, each of the arm portions 420b includes an arm portion opening 420d. That is, the arm portion 420b is connected to the frame portion 420a at either side of the arm portion opening 420d. Note that the need for the arm portion opening 420d can be eliminated or the arm portion 420b may be connected to the frame portion 420a at one of the two sides of the arm portion opening 420d. When the cross-sectional bending rigidity of the frame portion 420a is higher than that of the arm portions 420b, the first grouped optical member 411 can be efficiently vibrated.

Additionally, since the cross-sectional bending rigidity of the arm portions 420b is lower than that of the frame portion 420a, the vibration is attenuated by the arm portions 420b. Accordingly, vibration transferred from the lowpass filter holding member 420 to the image pickup element unit 500 via the arm portions 420b can be reduced.

According to the present embodiment, as noted above, the arm portions 420b of the lowpass filter holding member 420 are engaged with the image pickup element holding member 510 with the step-screw rubber bushes 531 therebetween using the step screws 530. More specifically, as shown in FIG. 13, the tops of the step-screw rubber bushes 531 protrude from the image pickup element holding member 510 towards the lowpass filter holding member 420 so as to be engaged with the arm portions 420b of the lowpass filter holding member 420.

In addition, the rubber sheet 520 is disposed between the lowpass filter holding member 420 and the image pickup element holding member 510.

In this way, a force that is caused by the rubber sheet 520 to move the lowpass filter unit 470 away from the image pickup element unit 500 matches a force that is caused by the step screws 530 to bring the lowpass filter unit 470 and the image pickup element unit 500 together. As a result, the lowpass filter unit 470 and the image pickup element unit 500 floatingly support each other without being in contact with each other such that the contraction of the step-screw rubber bushes 531 matches the contraction of the rubber sheet 520.

The arm portions 420b of the lowpass filter holding member 420 are disposed at four corners of the frame portion 420a having a substantially rectangular shape so that the center of gravity of the positions of the four frame portions 420a is substantially the same as the center of gravity of the first grouped optical member 411 in plane coordinates perpendicular to the light axis. Thus, even when the contraction of the step-screw rubber bushes 531 is not equal to the contraction of the rubber sheet 520, the inclination of the lowpass filter unit 470 can be minimized.

In addition, the four corners of the frame portion 420a have a high cross-sectional bending rigidity. Accordingly, the first grouped optical member 411 is efficiently vibrated.

FIG. 12A is a front view of the components including the vibration transfer member 431 and the biasing force transfer member 441. FIG. 12B is a side view of the components including the vibration transfer member 431 and the biasing force transfer member 441. The cross section of the vibration transfer member 431 has a substantially L shape. A surface 431a and a surface 431b of the vibration transfer member 431 are in contact with the first grouped optical member 411, and the vibration transfer member 431 is bonded to the first grouped optical member 411. Similarly, the biasing force transfer member 441 has a substantially L shape. A surface 441a and a surface 441b of the biasing force transfer member 441 are in contact with the first grouped optical member 411, and the biasing force transfer member 441 is bonded to the first grouped optical member 411.

Lengths A1 and A2 of a contact surface of the vibration transfer member 431 that is in contact with the piezoelectric element 430 in the imaging light axis direction and a direction perpendicular to the imaging light axis direction are greater than length B1 and B2 of a contact surface of the piezoelectric element 430 that is in contact with the vibration transfer member 431 in the imaging light axis direction and a direction perpendicular to the imaging light axis direction, respectively. That is, the contact surface of the vibration transfer member 431 is larger than the contact surface (vibratory surface) of the piezoelectric element 430. The entire contact surface of the piezoelectric element 430 is in contact with the contact surface of the vibration transfer member 431. Such a structure allows most of the force generated by the expansion and contraction of the piezoelectric element 430 to be transferred to the first grouped optical member 411. In addition, this structure prevents a locally-concentrated load from being applied to the first grouped optical member 411.

Similarly, lengths C1 and C2 of a contact surface of the first grouped optical member 411 in contact with the biasing member 440 in the imaging light axis direction and a direction perpendicular to the imaging light axis direction are greater than length D1 and D2 of a contact surface of the biasing member 440 in contact with the biasing force transfer member 441 in the imaging light axis direction and a direction perpendicular to the imaging light axis direction, respectively. That is, the contact surface of the biasing force transfer member 441 is larger than the contact surface the biasing member 440. Thus, the entire contact surface of the biasing member 440 is in contact with the contact surface of the biasing force transfer member 441. Such a structure allows most of the biasing force of the biasing member 440 to be transferred to the first grouped optical member 411. In addition, this structure prevents a locally-concentrated load from being applied to the first grouped optical member 411.

A bent portion 431c of the vibration transfer member 431 having a substantially L shape and a bent portion 441c of the biasing force transfer member 441 having a substantially L shape are disposed on the side facing the image pickup element 33. Such a structure allows the thickness of the lowpass filter unit 470 in the imaging light axis direction to be decreased.

According to the present embodiment, a metal having a coefficient of linear expansion similar to that of the first grouped optical member 411 is used for a material of the vibration transfer member 431 and the biasing force transfer member 441. Therefore, the adhesive layers between the vibration transfer member 431 and the first grouped optical member 411 and between the biasing force transfer member 441 and the biasing force transfer member 441 are not damaged by a shearing stress caused by a thermal stress due to a change in temperature. Thus, separation of the vibration transfer member 431 and the biasing force transfer member 441 from the first grouped optical member 411 can be prevented.

In addition, by employing a material having low attenuation, such as a metal, vibrations can be efficiently transferred from the piezoelectric element 430 to the first grouped optical member 411.

A maximum shearing stress F generated in the adhesive layers between the vibration transfer member 431 and the first grouped optical member 411 and between the biasing force transfer member 441 and the first grouped optical member 411 is expressed by the following equation:

$$F = G\frac{\Delta TL}{2t}(\alpha_1 - \alpha_2) \quad (2)$$

where G denotes the modules of rigidity of an adhesive agent, ΔT denotes a change in temperature, L denotes a maximum length of the contact surface, t denotes the thickness of the adhesive layer, $\alpha 1$ denotes the coefficient of linear expansion of the vibration transfer member 431 and the biasing force transfer member 441, and $\alpha 2$ denotes the coefficient of linear expansion of the first grouped optical member 411.

As can be seen from equation (2), as a difference between the coefficient of linear expansional $\alpha 1$ of the vibration transfer member 431 and the biasing force transfer member 441 and the coefficient of linear expansion $\alpha 2$ of the first grouped optical member 411 is decreased, the maximum shearing stress F generated in the adhesive layers can be decreased.

According to the present embodiment, the first grouped optical member 411 is formed from a quartz birefringent plate having a rotation angle of zero degrees (i.e., the X-axis of the quartz crystal is parallel to a short side of the first grouped optical member 411). In addition, the coefficient of linear expansion of the first grouped optical member 411 in the long-side direction thereof is in the range of about 10 to about 12 $(\times 10^{-6})/^\circ$ C. In contrast, the vibration transfer member 431 and the biasing force transfer member 441 are formed from a ferritic stainless steel. The coefficient of linear expansion of the vibration transfer member 431 and the biasing force transfer member 441 is in the range of about 10 to about 12 $(\times 10^{-6})/^\circ$ C. Since a ferritic stainless steel has low attenuation compared with a resin material having a similar coefficient of linear expansion, the vibration transfer member 431 and the biasing force transfer member 441 can efficiently transfer the vibration of the piezoelectric element 430.

The first grouped optical member 411 is formed from a quartz birefringent plate having a rotation angle of 90 degrees (i.e., the X-axis of the quartz crystal is parallel to a long side of the first grouped optical member 411). The coefficient of linear expansion of the first grouped optical member 411 in the long-side direction thereof is in the range of about 13 to about 15 $(\times 10^{-6})/^\circ$ C. In this case, the vibration transfer member 431 and the biasing force transfer member 441 should be formed from an austenitic stainless steel having a coefficient of linear expansion in the range of about 14 to about 17 $(\times 10^{-6})/^\circ$ C.

Alternatively, an aluminum alloy, a titanium alloy, a nickel alloy, a nickel-iron alloy, a nickel-chromium-iron alloy, or a nickel-iron-molybdenum alloy may be used for the vibration transfer member 431 and the biasing force transfer member 441. The reason why substantially the same coefficient of linear expansion is used is to prevent the vibration transfer member 431 and the biasing force transfer member 441 from being separated from the first grouped optical member 411 when bonded using an ultraviolet-curable adhesive agent. That is, in general, the camera is used in a temperature range from −10° C. to 40° C. The camera is designed so that the adhesive layers including the ultraviolet-curable adhesive agent between the vibration transfer member 431 and the first grouped optical member 411 and between the biasing force transfer member 441 and the first grouped optical member 411 are not damaged by a shearing stress due to a thermal stress caused by a change in temperature in that range.

In addition, when the vibration transfer member 431 and the biasing force transfer member 441 are bonded to the first grouped optical member 411, the occurrence a thermal stress should be avoided. Therefore, an adhesive agent curable at a room temperature can be used, not a heat-curable adhesive agent. According to the present embodiment, an ultraviolet-curable adhesive agent is used. However, a two-liquid mixing adhesive agent or other adhesive agents curable in a room temperature may be used.

As noted above, the rubber sheet 520 seals between the lowpass filter holding member 420 and the image pickup element 33. In addition, the piezoelectric element 430 and the first resilient member 480 seal between the first grouped optical member 411 and the lowpass filter holding member 420. Accordingly, a sealed space that prevents a foreign substance, such as dust or dirt, from entering is formed between the first grouped optical member 411 and the image pickup element 33.

Furthermore, the lowpass filter unit 470 including the first grouped optical member 411 is configured so as to sandwich the rubber sheet 520 with the image pickup element unit 500. Still furthermore, the lowpass filter unit 470 is connected to the image pickup element unit 500 with the step-screw rubber bushes 531 therebetween using the step screws 530. In this way, the vibration of the lowpass filter unit 470 is attenuated by the rubber sheet 520 and the step-screw rubber bushes 531. Accordingly, the vibration is not transferred to the image pickup element 33.

In such a structure, when the piezoelectric element 430 vibrates, the vibration has little negative impact on the image pickup element 33. As a result, the structures subjected to the vibration can be limited. That is, only the first grouped optical member 411 that is desired to vibrate can be particularly vibrated. Accordingly, the total mass of the structure subjected to the vibration can be reduced, and therefore, the energy required for driving the piezoelectric element 430 can be reduced.

In addition, since little vibration of the first grouped optical member 411 is transferred to the image pickup element 33, damage to the image pickup element 33, such as separation of the image pickup element 33, can be prevented. Furthermore, when a shock is applied to the camera, very little of the shock is transferred to the piezoelectric element 430. Thus, damage to the piezoelectric element 430 due to a shock applied to the camera can be prevented.

As mentioned earlier, the first grouped optical member 411 (the vibration transfer member 431) is not bonded to the piezoelectric element 430. That is, the first grouped optical member 411 is not coupled with the piezoelectric element 430. Accordingly, when a periodic voltage is applied to the piezoelectric element 430 and the piezoelectric element 430 expands and contracts, the piezoelectric element 430 generates only a force in a direction in which the first grouped optical member 411 is urged. A force in a direction in which the first grouped optical member 411 is pulled is not generated. Thus, even when a high-frequency voltage in an ultrasonic range is applied to the piezoelectric element 430, excess pulling force is not applied to the piezoelectric element 430. Accordingly, damage, such as separation in the layer portion, can be prevented.

An exemplary operation of removing a foreign substance, such as dust or dirt, deposited on the surface of the first grouped optical member 411 according to the present embodiment is described next. When a user operates the cleaning instruction operation member 44, the camera receives a cleaning mode start instruction. Thus, the camera enters a cleaning mode.

According to the present embodiment, the cleaning instruction operation member 44 is provided to the camera. However, the present invention is not limited thereto. For example, an operation member used for instructing the camera to enter the cleaning mode is not limited to a mechanical button. The operation member may be one for selecting an instruction from a menu displayed on the color liquid crystal monitor 19 using a cursor key or an instruction button. Alternatively, the camera may automatically enter the cleaning mode in a normal operating sequence of the camera, such as power-on and power-off operations of the camera. Alternatively, the camera may automatically enter the cleaning mode on the basis of the number of image captures or a date and time.

The power supply circuit 110 supplies electrical power required in the cleaning mode to the components of the camera body 1. Concurrently, the power supply circuit 110 detects the level of a battery of the power supply unit 42 and sends the detected result to the MPU 100.

Upon receipt of a cleaning mode start signal, the MPU 100 sends a driving signal to the piezoelectric element driving circuit 111. Upon receipt of the driving signal from the MPU 100, the piezoelectric element driving circuit 111 generates a periodic voltage for driving the piezoelectric element 430 and applies that periodic voltage to the piezoelectric element 430. The piezoelectric element 430 expands and contracts in accordance with the applied voltage.

When the piezoelectric element 430 expands, the first grouped optical member 411 is urged by the piezoelectric element 430 and is moved in a direction perpendicular to the imaging light axis (i.e., the surface direction). The biasing member 440 contracts by the amount of movement of the first grouped optical member 411. The optical member 411 is urged towards the piezoelectric element 430 by the biasing member 440. Accordingly, when the piezoelectric element 430 contracts, the piezoelectric element 430 moves while following the contraction of the piezoelectric element 430.

When the periodic voltage is applied to the piezoelectric element 430, the above-described movement is repeated. The optical member 411 vibrates in accordance with the periodic expansion and contraction of the piezoelectric element 430. The vibration of the first grouped optical member 411 allows a foreign substance, such as dust or dirt, deposited on the surface of the first grouped optical member 411 to be removed.

According to the present embodiment, in order to cause the second resilient member 490 to be grounded to the regulation member 460 although the non-conductive mask member 560 is present, the opening 560a is formed in the mask member 560. However, the present invention is not limited thereto. That is, it is only required that the mask member 560 does not interfere with the protrusion 490a of the second resilient member 490. For example, a notch may be formed in the mask member 560, and the protrusion 490a of the second resilient member 490 may be in contact with the regulation member 460 through the notch.

In addition, the mask member 560 and the adhesive layers may be formed from an electrically conductive material. In this case, even when the protrusion 490a is not formed on the second resilient member 490, the first grouped optical member 411 can be grounded to a potential that is the same as that of the body chassis 300 via the second resilient member 490, the adhesive layers, the mask member 560, and the regulation member 460.

In addition, when the mask member 560 is not necessary, an adhesive layer having an opening may be formed on the regulation member 460 or the second resilient member 490, and the regulation member 460 may be grounded to the second resilient member 490 through the opening. Alternatively, a conductive adhesive layer may be formed on the regulation member 460 or the second resilient member 490, and the regulation member 460 may be grounded to the second resilient member 490.

Furthermore, a two-sided adhesive tape may be adhered to the surface of the regulation member 460 on the side facing the second resilient member 490 so as to partially overlap the second resilient member 490. The second resilient member 490 may be grounded to the regulation member 460 at a location at which the two-sided adhesive tape does not overlap with the second resilient member 490. Alternatively, a conductive two-sided adhesive tape may be adhered to the surface of the regulation member 460 on the side facing the second resilient member 490 so that at least part of the two-sided adhesive tape overlaps the second resilient member 490. Thus, the second resilient member 490 may be grounded to the regulation member 460.

In addition, while the present embodiment has been described with reference to the second resilient members 490 having a long and thin plate shape and disposed at two locations, the second resilient member 490 have a ring shape can be used. Furthermore, while the present embodiment has been described with reference to a conductive elastomer as the material of the second resilient member 490, the present invention is not limited thereto. Any polymeric material having electrical conductivity and elasticity can be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-198554 filed Jul. 20, 2006, which is hereby incorporated by reference herein in its entirety.

What is claimed is:

1. An image pickup apparatus comprising:
   an image pickup element configured to convert an optical image of a subject into an electrical signal;
   an optical member configured to modulate an incident light beam into a predetermined light beam and output the predetermined light beam, the optical member having a substantially rectangular shape and being disposed in front of the image pickup element along an optical axis for image taking;
   a vibrating unit disposed on a side surface of the optical member, wherein the vibrating unit provides the vibration in vertical direction towards the imaging light axis to the optical member;
   a biasing member disposed on another side surface of the optical member that is opposite to the side surface that the vibrating unit is disposed, the biasing member urging the optical member towards the vibrating unit;
   a holding member configured to hold the optical member, the vibrating unit, and the biasing member side by side in a vertical direction towards the imaging light axis; and
   chassis member having an opening therein,
   wherein the holding member is in the opening of the chassis member and disposed at the position substantially the same as that of the chassis member in the imaging light axis direction.

2. The image pickup apparatus according to claim 1, wherein the vibrating unit is formed from a layered piezoelectric element.

3. The image pickup apparatus according to claim 1, wherein the biasing member is formed from a high molecular weight polymer.

4. The image pickup apparatus according to claim 1, further comprising an eyepiece unit configured to facilitate viewing an optical image of an object, wherein the vibrating unit is disposed on the side surface of the optical member close to the eyepiece unit.

* * * * *